UNITED STATES PATENT OFFICE.

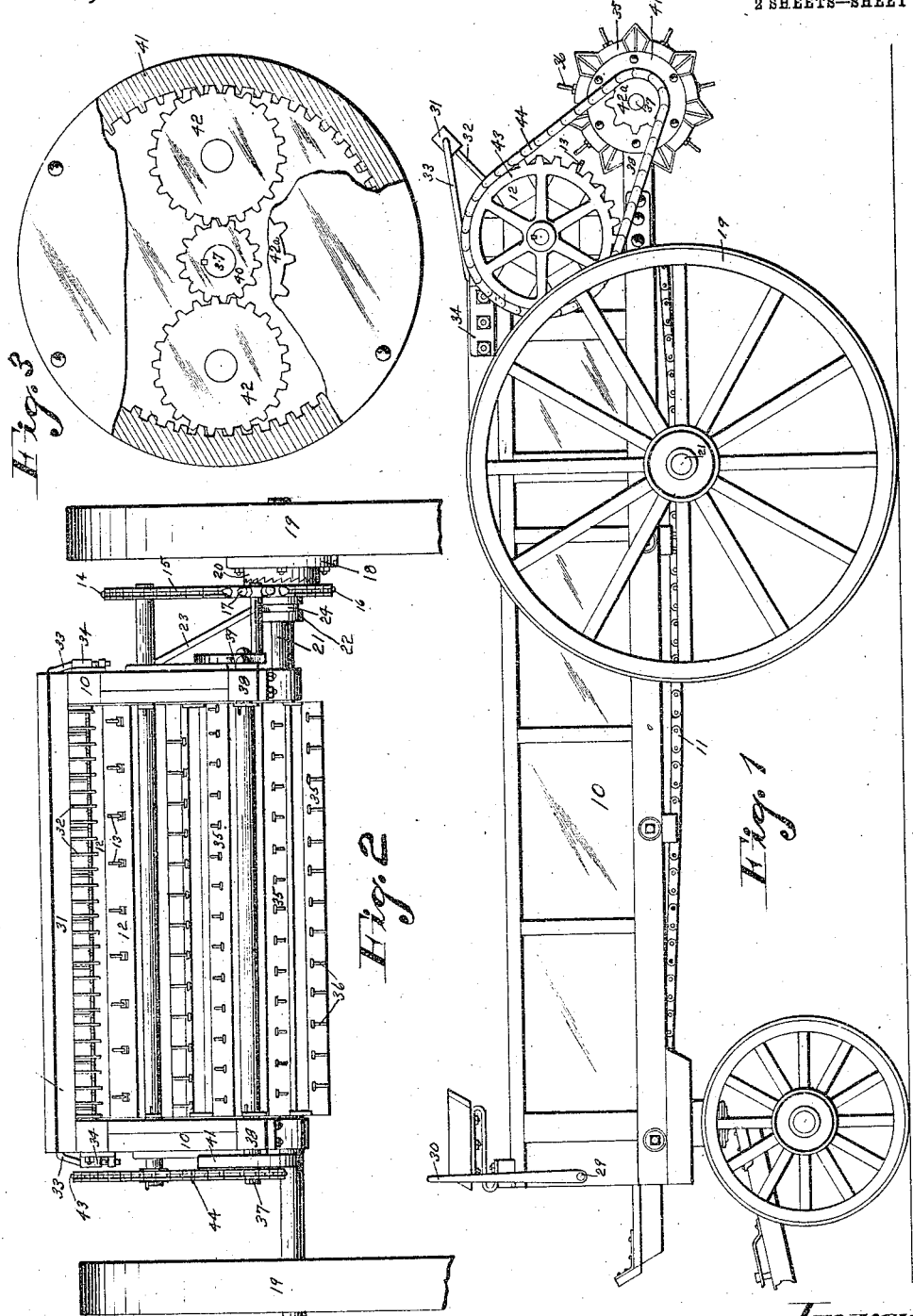

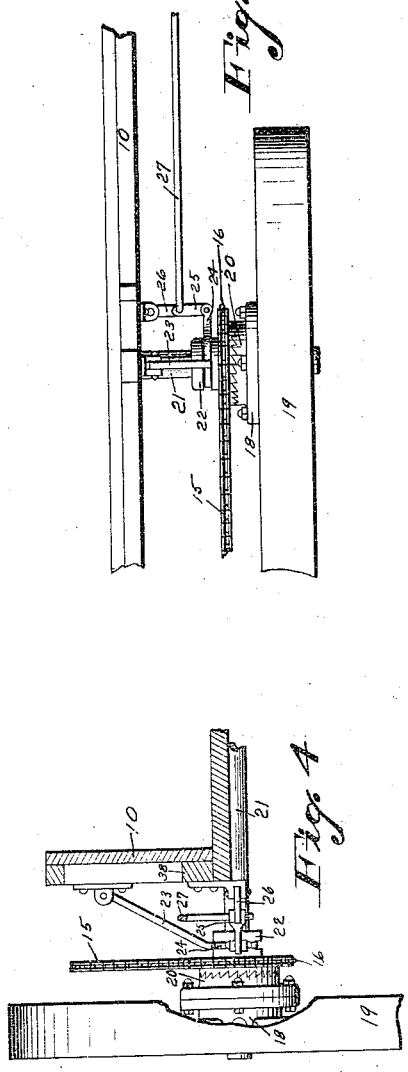

WILLARD J. COOK, OF DES MOINES, IOWA.

MANURE-SPREADER.

947,374.  Specification of Letters Patent.   Patented Jan. 25, 1910.

Application filed July 10, 1907. Serial No. 383,024.

*To all whom it may concern:*

Be it known that I, WILLARD J. COOK, a citizen of the United States, residing at Des Moines, in the county of Polk and State of Iowa, have invented a certain new and useful Manure-Spreader, of which the following is a specification.

This invention relates to that class of manure spreaders comprising a wagon body and a movable apron in the wagon body, designed to receive the load, and also designed to slowly move the load rearwardly by power from the traction wheels on the device.

My object is to provide means for removing manure from the apron at the rear of the wagon body, and also for spreading it, which means may be operated by a minimum of power, and will distribute manure over a comparatively large area.

More specifically it is my object to provide, at the rear of the machine, an unloading cylinder having teeth designed to engage the manure and move it downwardly and rearwardly to rake the manure off of the rear end of the wagon body, which unloading-cylinder is operated at comparatively low speed, and which does not have to raise the manure while carrying it apart from the remainder of the load, and also to provide a spreading cylinder positioned to receive the manure from the unloading cylinder, and arranged to run at a high speed so that the manure deposited thereon will be torn apart and distributed over a comparatively large area.

A further object is to provide means for cleaning the teeth of the unloading cylinder to prevent manure from lodging thereon.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a side elevation of the left side of a manure spreader embodying my invention. Fig. 2 shows a rear end elevation of same. Fig. 3 shows an enlarged detail view illustrating the gearing mechanism for operating the spreader cylinder. Fig. 4 shows a sectional view on the line 4—4 of Fig. 6, looking rearwardly, and showing only one side of the wagon body, and a part of the adjacent supporting wheel, to illustrate the clutch mechanism. Fig. 5 shows a detail top view of same, and Fig. 6 shows a side elevation of the right side of the machine embodying my invention.

Referring to the accompanying drawings, I have used the reference numeral 10 to indicate the wagon body containing the movable apron 11. These parts are of the ordinary construction, and the apron may be driven in any desired way.

Mounted at the rear of the wagon body slightly above the movable apron, is an unloading cylinder comprising cylinder bars 12 having teeth 13 therein, the teeth on each bar being spaced apart an equal distance, and those on one bar being arranged slightly on one side of the path of those on the adjacent bar, so that the teeth will not follow in exactly the same path during their rotation. On one end of the unloading cylinder is a sprocket wheel 14 driven by means of a sprocket chain 15 connected with a sprocket wheel 16 of the hub of one of the rear wheels. A chain tightener 17 is provided to engage this chain to take up the slack. I have also provided for throwing the sprocket wheel 16 into and out of gear as follows: Secured to the hub 18 of the rear wheel 19 is a ratchet clutch member 20, and slidingly mounted on the rear axle 21 is a mating clutch member 22. Pivoted to the side of the wagon body above the clutch member 22 is a forked rod having its forked end inserted in a groove in the clutch member 22. An arm 24 extends forwardly from the forked rod 23, and a link 25 is attached to it. A second link 26 is pivoted to the wagon body adjacent to the link 25, and these two links are pivotally connected with each other and with a rod 27, which rod is pivoted at the forward end of the wagon to a crank arm 28 on the shaft 29, which shaft is controlled by the lever 30. The parts are so arranged in proportion that when the rod 27 is moved rearwardly to the position shown in Fig. 5, then the links 25 and 26 will be substantially in line, and will hold the sliding clutch member firmly in engagement with the clutch member that is attached to the wheel hub, and when said rod is pulled forwardly, it will cause the sliding clutch member to move to position out of engagement with the clutch member on the wheel.

I have provided a device for cleaning the teeth on the unloading cylinder as follows: The numeral 31 indicates a bar having straight teeth 32 therein, said bar supported by the arms 33 attached to the brackets 34 on the wagon body. The teeth 32 are so positioned that they extend downwardly and forwardly at an angle of about 45 degrees relative to the center of the unloading cylinder, and the teeth are spaced apart such a distance with relation to the teeth on the unloading cylinder that the teeth on the unloading cylinder will not engage the teeth 32. This arrangement is clearly shown in Fig. 2 of the drawings. The teeth 32 are arranged to run as close as practicable to the bars 12, and obviously, if any manure should become lodged between the teeth 13, it will be dislodged by the teeth 32, and permitted to drop downwardly.

I have provided for spreading manure unloaded from the wagon body by the unloading cylinder as follows: Supported below and in the rear of the unloading cylinder is a spreading cylinder comprising bars 35 having teeth 36 thereon. The cylinder is fixed to a shaft 37 which is supported on arms 38 at the rear of the wagon body. The connection is made adjustable by means of the slotted bearing 39 of the ordinary form, so that the spreading cylinder may be adjusted toward and from the unloading cylinder. The teeth of the spreading cylinder are so arranged with relation to the teeth on the unloading cylinder that if the spreading cylinder should be adjusted to position where the teeth would overlap those on the unloading cylinder, they will not come into contact therewith. This arrangement is clearly illustrated in Fig. 2.

I provide for driving the spreading cylinder as follows: On one end of the shaft 37 is a pinion 40, keyed thereto, and rotatably mounted on the shaft 37 is an internal gear wheel 41. Rotatably mounted within the internal gear wheel 41 are two pinions 42 in mesh with the internal gear teeth, and also in mesh with the pinion 40. On the outer surface of the internal gear wheel 41 is a small sprocket wheel 42ª which is firmly fixed to the internal gear wheel 41. A large sprocket wheel 43 is fixed to the shaft of the unloading cylinder, and connected with the sprocket wheel 42ª by means of the sprocket chain 44. By means of the gearing device described, it is obvious that the internal gear wheel 41 will be rotated at a higher speed than the unloading cylinder and in a direction with its top moving forwardly relative to the wagon body, and this movement of the internal gear wheel will be transformed by the pinions 40 and 42 into an increased speed with the upper portion of the cylinder moving rearwardly. I preferably so proportion these parts that the spreading cylinder will rotate about twelve revolutions to one revolution of the unloading cylinder, and since the teeth of one cylinder slightly overlap those of the other, the spreading cylinder will also clean the teeth of the unloading cylinder.

In practical use, and assuming that the wagon body is loaded with manure, and the clutch device is thrown into gear, then when the manure spreader is started, the teeth on the unloading cylinder will tear apart the adjacent manure and move it rearwardly over the rear end of the apron. It will not require much power to do this, for the reason that the unloading cylinder is operated at comparatively low speed, and yet it will unload just as much manure as would be unloaded by a similarly shaped cylinder rotated in the opposite direction at a much higher speed.

I have found that in the use of manure spreaders of the type in which the spreading cylinder is arranged above the apron, and has its forward portion moving upwardly, the cylinder will in many instances fail to turn when the machine is advanced, on account of the manure on the apron that is in engagement with the cylinder bars and teeth, hence it is customary in the use of said machines to place a partition between the manure and the spreading cylinder when the machine is being filled, and to remove this partition when starting the machine. When this is done, little or no manure will be spread by the cylinder until the machine has been advanced a considerable distance, and the apron moved rearwardly far enough to bring the manure against the cylinder. By the arrangement herein shown and described, these difficulties are all obviated.

In loading my improved machine, the manure may be piled close to the unloading cylinder, and then the cylinder will begin to rotate immediately upon the advance of the machine, because it takes only a very slight power to move the manure downwardly and rearwardly under the spreader, as compared with the power required to move it forwardly and upwardly over the top of the spreading cylinder. Furthermore, because in my improved device this unloading cylinder is rotated at a slow speed, the machine may be readily and easily started with the manure piled close to the unloading cylinder. During the movement of the manure downwardly and rearwardly by the unloading cylinder, it will be partly torn apart, and will be deposited upon the spreading cylinder with all of the large lumps or masses broken apart. Then when this manure strikes upon the forward upper portion of the spreading cylinder, it will be torn apart into very fine particles on account of the rapid motion of the spreading cylinder, and also on account of the fact that the teeth on the unloading cylinder will act as retarding teeth, and thus co-act with the rapidly moving teeth on the spreading cylinder to further tear apart and break up all of the large particles of the manure.

I am enabled to operate the spreader cylinder at a very high speed with comparatively little power, because the manure is discharged upon it in small quantities, and the power required to operate it will be only slightly more than the power required to operate a balance wheel.

I have found by experiment that by the use of my improved machine, manure may be finally separated and spread upon the same spot at which the loaded machine is started in its movement, for the reason that as soon as the machine is advanced, the unloading cylinder immediately deposits manure upon the spreading cylinder, and then this manure is thrown rearwardly a considerable distance.

One of the important features in connection with my improved device, is that the lower or spreading cylinder is so arranged with relation to the upper one, and to the apron, that it does not at any time come in direct contact with the body of manure on the apron, and hence, it may be rotated at a high speed without being subjected to the retarding and binding influence which is the case in connection with spreading cylinders that come in contact with the body of manure. Hence, it may run freely and require very little more power than an ordinary balance wheel of similar weight. It is practically impossible to get power enough from the traction wheels of a device of this kind, to run a cylinder at high speed, which is in direct contact with the body of manure. Hence, by providing a low speed cylinder to be in contact with the body of manure, and to move it downwardly and rearwardly, and also a high speed cylinder arranged out of contact with the manure, but in position to receive the discharge from the low speed cylinder, I attain a result which is highly advantageous, for I can remove the manure from the apron with a low speed cylinder requiring very little power, and then spread it over a wide path with a high speed cylinder that runs without being in direct contact with the body of the manure.

Having thus described my invention, what I claim and desire to secure by Letters Patent of the United States, therefor, is—

1. A manure spreader, comprising a wagon body, a toothed cylinder at the discharge end of the wagon body in position to engage the material in the wagon body, means for rotating said cylinder so that its forward portion moves downwardly and discharges material downwardly and rearwardly from the rear of the wagon body, a distributing cylinder arranged below and in the rear of the first mentioned cylinder and in position to avoid friction between the material engaged thereby and any part of the wagon body, and arranged in such position that the material discharged from the first cylinder will strike upon its upper portion, and means for rotating the distributing cylinder in a direction opposite from the first to throw the material upwardly and rearwardly.

2. A manure spreader, comprising a wagon body, a toothed cylinder at the discharge end of the wagon body in position to engage the material in the wagon body, means for rotating said cylinder so that its forward portion moves downwardly and discharges material downwardly and rearwardly from the rear of the wagon body, a distributing cylinder arranged below and in the rear of the first mentioned cylinder and in position to avoid friction between the material engaged thereby and any part of the wagon body, and arranged in such position that the material discharged from the first cylinder will strike upon its upper portion, and means for rotating the distributing cylinder in a direction opposite from the first to throw the material upwardly and rearwardly, said means including a speed-increasing gearing for the second cylinder.

3. A manure spreader, comprising a wagon body, a toothed cylinder at the discharge end of the wagon body in position to engage the material in the wagon body, means for rotating the said cylinder so that its forward portion moves downwardly and discharges material downwardly and rearwardly from the rear of the wagon body, a toothed distributing cylinder arranged below and in the rear of the first mentioned cylinder and in position to avoid friction between the material engaged thereby and any part of the wagon body, and arranged in such position that the material discharged from the first cylinder will strike upon its upper portion, and means for rotating the distributing cylinder in a direction opposite from the first to throw the material upwardly and rearwardly, said cylinders being so arranged with relation to each other that the teeth will co-act in tearing apart the material.

4. A manure spreader, comprising a wagon body, a toothed cylinder at the discharge end of the wagon body in position to engage the material in the wagon body, means for rotating the said cylinder so that its forward portion moves downwardly and discharges material downwardly and rearwardly from the rear of the wagon body, a toothed distributing cylinder arranged below and in the rear of the first mentioned cylinder and in position to avoid friction between the material engaged thereby and any part of the wagon body, and arranged in such position that the material discharged from the first cylinder will strike upon its upper portion, and means for rotating the distributing cylinder in a direction opposite from the first to throw the material upwardly and rearwardly, said means including a speed-increasing gearing for the distributing cylinder, said cylinders being so arranged with relation to each other, that the teeth will coact in tearing apart the material.

5. In a device of the class described, the combination of a wagon body, supporting wheels therefor, an unloading cylinder mounted at the rear thereof above the bottom, means for rotating the unloading cylinder by power from a supporting wheel, in a direction with its forward portion moving downwardly, a clutch device for throwing said cylinder into and out of gear, a spreading cylinder arranged below and in the rear of the unloading cylinder, means for adjusting it relative to the unloading cylinder, said spreading cylinder provided at one end with a pinion fixed relative thereto, an internal gear wheel rotatably mounted adjacent to one end of the spreading cylinder, pinions thereon in mesh with the internal gear, and with the pinion on the spreading cylinder, and sprocket gearing for connecting the unloading cylinder with the internal gear wheel, a toothed cleaner bar supported above and in the rear of the unloading cylinder, with its teeth projecting downwardly and forwardly, and arranged to pass between and close to the teeth on the unloading cylinder.

Des Moines, Iowa, July 3, 1907.

WILLARD J. COOK.

Witnesses:
S. F. CHRISTY,
N. E. BENNETT.